US 6,463,193 B2

(12) United States Patent
Paniccia et al.

(10) Patent No.: US 6,463,193 B2
(45) Date of Patent: Oct. 8, 2002

(54) METHOD AND APPARATUS FOR SWITCHING AN OPTICAL BEAM USING A PHASE ARRAY DISPOSED IN A HIGHER DOPED WELL REGION

(75) Inventors: Mario J. Paniccia; Dmitri E. Nikonov, both of Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 09/732,033

(22) Filed: Dec. 6, 2000

(65) Prior Publication Data

US 2002/0093717 A1 Jul. 18, 2002

(51) Int. Cl.[7] .................................................. G02B 6/26
(52) U.S. Cl. ............................ 385/18; 385/14; 385/15; 385/16; 385/17; 385/40; 385/41; 385/42
(58) Field of Search ............................. 385/14, 15, 16, 385/17, 40, 41, 42, 18; 359/341; 437/129

(56) References Cited

U.S. PATENT DOCUMENTS

| | | | | |
|---|---|---|---|---|
| 4,746,183 A | * | 5/1988 | Soref et al. ................ 385/14 X |
| 4,787,691 A | * | 11/1988 | Lorenzo et al. ........... 385/14 X |
| 5,065,207 A | * | 11/1991 | Heinen ...................... 385/14 X |
| 5,125,065 A | * | 6/1992 | Stoll et al. .................. 385/130 |
| 5,136,670 A | * | 8/1992 | Shigematsu et al. .......... 385/42 |
| 5,227,913 A | * | 7/1993 | McCaughan et al. ........ 359/341 |
| 5,908,305 A | * | 6/1999 | Crampton et al. .......... 438/141 |
| 6,298,177 B1 | * | 10/2001 | House ........................... 385/3 |

OTHER PUBLICATIONS

E.D. Novak, L. Ding, Y.T. Loh, and C. Hu, "Speed, Power, and Yield Comparison of Thin Bonded SOI versus Bulk SMOS Technologies", in *Proceedings 1993 IEEE International SOI Conference,* Oct. 1994, VLSI Technology, Inc., San Jose, CA, pp. 41–42.

* cited by examiner

Primary Examiner—Brian Healy
(74) Attorney, Agent, or Firm—Blakely, Sokoloff, Taylor & Zafman LLP

(57) ABSTRACT

A device for switching an optical beam in an optical switch. In one embodiment, the disclosed optical switch includes an optical switching device disposed in a well region in a semiconductor substrate layer. In one embodiment, the well region has a higher doping concentration than the semiconductor substrate layer in which the well region is disposed. The optical switching device is optically coupled to an optical input port and an optical output port of the integrated circuit die.

27 Claims, 4 Drawing Sheets

METHOD AND APPARATUS FOR SWITCHING AN OPTICAL BEAM USING A PHASE ARRAY DISPOSED IN A HIGHER DOPED WELL REGION

BACKGROUND OF THE INVENTION

1. Field of the Invention

The present invention relates generally to the switching signals and, more specifically, the present invention relates to switching or modulating optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
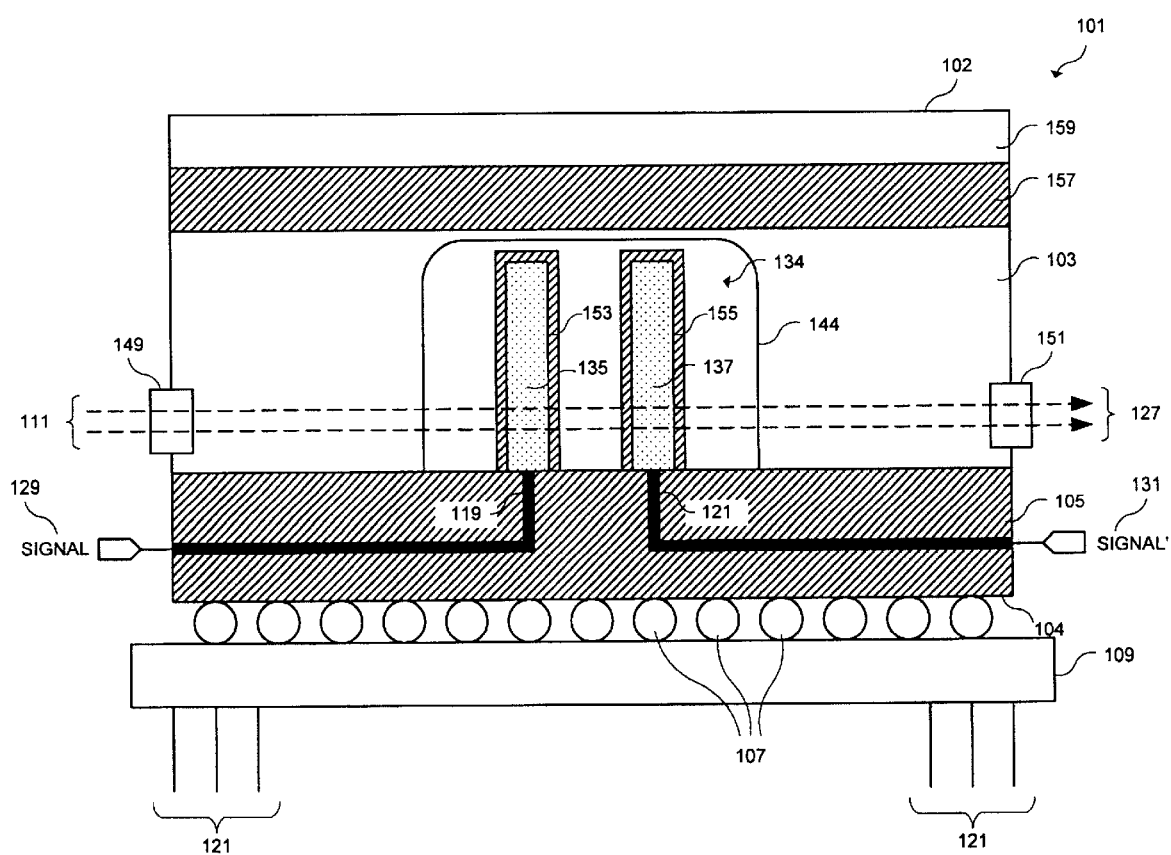
FIG. 1 is a side view illustration of one embodiment of an optical switch including an optical switching device disposed in a highly doped well region in accordance with the teachings of the present invention.

Methods and apparatuses for switching or modulating an optical beam in an optical switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switch or modulator is provided in a fully integrated solution on a single integrated circuit chip. One embodiment of the presently described optical switch includes an optical switching device disposed in a relatively highly doped well region in a semiconductor substrate and can be used in a variety of high bandwidth applications including multi-processor, telecommunications, networking or the like.

In one embodiment, the presently described optical switching device is used to modulate an optical beam and includes a stack of trench capacitors disposed in a higher doped well region of a lower doped silicon semiconductor substrate layer. In one embodiment, optical confinement layers and/or regions are employed to help confine an optical beam to pass through an array of waveguides. In one embodiment, the array of such waveguides, each containing a stack of trench capacitors, may also be referred to as a phase array and may be used to switch, modulate, route, etc. an optical beam in accordance with the teachings of the present invention.

Charge in the array is modulated by the trench capacitors to modulate the optical beam directed through the array in response to a signal. In one embodiment, the trench capacitors are operated in accumulation mode in the higher doped well region to increase switching speed. In one embodiment, the optical beam propagates outside the higher doped well region in for example lower doped substrate or another suitable optically transparent material to reduce attenuation of the optical beam.

In one embodiment, the control circuitry used to generate the signal to modulate the optical beam is integrated in the same die as the array. Thus, in one embodiment the array and the control circuitry are fully integrated on the same integrated circuit chip. In one embodiment, the optical beam is switched by the array selectively attenuating the optical beam. In another embodiment, the optical beam is switched by selectively modulating the phase of at least a portion of the optical beam.

FIG. 1 is a side view illustration of one embodiment of an optical switch 101 including an optical switching device 134 disposed in a higher doped well region 144 in accordance with the teachings of the present invention. In one embodiment, well region 144 is a doped region having a different doping concentration than the semiconductor substrate layer 103 in which well region 144 is disposed. In one embodiment, optical switch 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of optical switch 101 and the pins 121 of package substrate 109, thereby reducing inductance problems associated with typical wire bond integrated circuit packaging technologies. In one embodiment, the internal integrated circuit nodes of optical switch 101 are located towards the front side 104 of optical switch 101. Another characteristic of flip chip packaging is that full access to a back side 102 of optical switch 101 is provided. It is appreciated that in another embodiment, optical switch 101 is not limited to being mounted in a flip chip packaged configuration. In other embodiments, packaging technologies other than flip chip packaging may be employed in accordance with the teachings of the present invention such as for example but not limited to wire bond packaging or the like.

In one embodiment, optical switching device 134 includes a stack of trench capacitors including trench capacitor 135 and trench capacitor 137, as illustrated in FIG. 1. In one embodiment, trench capacitors 135 and 137 include polysilicon disposed in a higher doped well region 144, which is disposed in a lower doped semiconductor substrate layer 103 of optical switch 101. In one embodiment, well region 144 has a higher doping concentration than semiconductor substrate layer 103. In one embodiment, semiconductor substrate layer 103 and well region 144 include silicon. As illustrated in FIG. 1, one embodiment of optical switch 101 includes an insulating region 153 disposed between the polysilicon of trench capacitor 135 and well region 144. Similarly, an insulating region 155 is disposed between the polysilicon of trench capacitor 137 and well region 144.

In one embodiment, a signal 129 and a signal' 131 are coupled to be received by trench capacitors 135 and 137, respectively, of optical switching device 134. In one embodiment, signal 129 and signal' 131 are generated by control circuitry on the integrated circuit die of optical switch 101. In one embodiment, the control circuit generating signal 129 and signal' 131 is disposed in semiconductor substrate layer 103 outside of the optical path between optical input port 149 and optical port 151. In another embodiment, signal 129 and signal' 131 are generated by control circuitry external to the integrated circuit die of optical switch 101. In one embodiment, signal 129 and signal' 131 are coupled to be received by trench capacitors 135 and 137 through conductors 119 and 121, which are disposed in an optical confinement layer 105 of optical switch 101. In one embodiment, optical confinement layer 105 is an insulating layer and includes a dielectric layer of optical switch 101.

In one embodiment, signal 129 and signal' 131 are a plurality of signals separately coupled to be received by the trench capacitors 135 and 137 in optical switching device 134. For example, in one embodiment, signal 129 and signal' 131 are the same signals having opposite polarities. In another embodiment, signal 129 and signal' 131 are the same signals having the same polarities. In yet another embodiment, signal 129 and signal' 131 are separate signals coupled to capacitors across the array to control or modulate a charge distribution of free charge carriers across the stack of trench capacitors 135 and 137.

As illustrated in FIG. 1, one embodiment of optical switch 101 includes an optical input port 149 and an optical output port 151 disposed in or optically coupled to semiconductor substrate layer 103 on different sides of the stack of trench capacitors 135 and 137 of optical switching device 134. In one embodiment, an optical beam 111 is directed through optical input port 149 and through semiconductor substrate layer 103 into well region 144 to the stack of trench capacitors 135 and 137 of optical switching device 134. In one embodiment, optical beam 111 is directed into optical input port 149 through an optical fiber or the like. In one embodiment, semiconductor substrate layer 103 and well region 144 include silicon and trench capacitors 135 and 137 include polysilicon. In one embodiment, optical beam 111 includes infrared or near infrared laser light. As known to those skilled in the art, silicon is partially transparent to infrared or near infrared light. For instance, in one embodiment in which optical switch 101 is utilized in telecommunications, optical beam 111 has an infrared wavelength of approximately 1.55 or 1.3 micrometers.

As will be discussed, optical beam 111 is switched or modulated by the stack of trench capacitors 135 and 137 of optical switching device 134 in one embodiment. A switched optical beam 127 is then directed from the stack of trench capacitors 135 and 137 through semiconductor substrate layer 103 to optical output port 151. In one embodiment, switched optical beam 127 is directed from optical output port 151 through an optical fiber or the like. It is appreciated that in other embodiments (not shown), optical beam 111 and switched optical beam 127 may enter and/or exit semiconductor substrate layer 103 through back side 102 and/or front side 104 in accordance with the teachings of the present invention.

In one embodiment, optical switch 101 includes an optical confinement layer 157 disposed proximate to semiconductor substrate layer 103. Thus, semiconductor substrate layer 103 is disposed between optical confinement layer 157 and optical confinement layer 105. In one embodiment, optical confinement layer 157 is an insulating layer. In particular, optical energy or light from optical beam 111 or switched optical beam 127 is reflected from the interfaces between semiconductor substrate layer 103 and optical confinement layer 157 or optical confinement layer 105. For example, light from optical beam 111 will have an angle of incidence θ relative to the interface between semiconductor substrate layer 103 and optical confinement layer 157 or optical confinement layer 105. For purposes of this disclosure, an incident angle θ is the angle that an optical beam makes with an imaginary line perpendicular to a surface at the point of incidence. In the embodiment depicted in FIG. 1, optical beam 111 or switched optical beam 127 is deflected off the interface between semiconductor substrate layer 103 and optical confinement layer 157 or optical confinement layer 105 because of total internal reflection.

In one embodiment, optical confinement layer 157 and optical confinement layer 105 include silicon oxide or the like and have an index of refraction of approximately $n_{oxide}=1.5$ and semiconductor substrate layer 103 includes silicon and has an index of refraction of approximately $n_{si}=3.5$. In order to have total internal reflection of optical beam 111 or switched optical beam 127, the incident angle θ of optical beam 111 or switched optical beam 127 relative to the interface between semiconductor substrate layer 103 and optical confinement layer 157 or optical confinement layer 105 satisfies the following relationship:

$$\sin \theta > n_{oxide}/n_{si} \qquad \text{(Equation 1)}$$

As a result of the total internal reflection, optical beam 111 is in one embodiment is confined to remain with semiconductor substrate layer 103 and well region 144 using optical confinement layer 157 and optical confinement layer 105 until switched optical beam 127 exits through optical output port 151.

In one embodiment, optical switch 101 is constructed from a silicon-on-insulator (SOI) wafer. For instance, during manufacture, a known SOI wafer is provided including a semiconductor substrate layer 159, optical confinement layer 157 and semiconductor substrate layer 103. Well region 144 is formed having a higher doping concentration than semiconductor substrate layer 103 and then trench capacitors 135 and 137 of optical switching device 134 are then formed in well region 144. In one embodiment, trench capacitors are fabricated to be approximately 1–2 μm deep. It is appreciated of course that in other embodiments, trench capacitors 135 and 137 may have different depths in accordance with the teachings of the present invention. Next, optical confinement layer 105 is formed with conductors 119 and 131 providing accesses to trench capacitors 135 and 137. Afterwards, ball bonds 107 and package substrate 109 are added.

Figure 2:
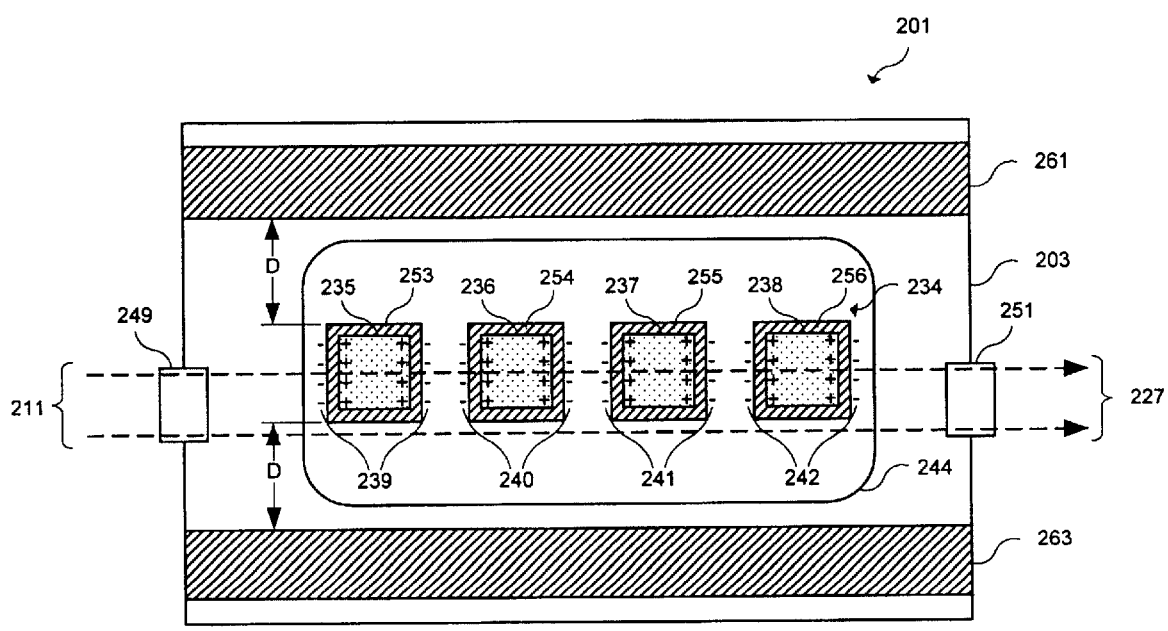
FIG. 2 is a top view illustration of one embodiment of an optical switch including an optical switching device disposed in a highly doped well region that is biased to modulate a phase of a portion of an optical beam in accordance with the teachings of the present invention.

FIG. 2 is a top view illustration of an optical switch 201 including a higher well region 244 in which an optical switching device 234 is disposed that is biased such that an optical beam 211 is switched in accordance with the teachings of the present invention. As illustrated, an optical switching device 234, including a stack of trench capacitors 235, 236, 237 and 238, is disposed in a higher doped well region 244, which is disposed in a lower doped semiconductor substrate layer 203. As shown in the embodiment depicted in FIG. 2, the polysilicon regions of trench capacitors 235, 236, 237 and 238 are surrounded by insulating regions 253, 254, 255 and 256, respectively. An optical path is disposed between optical input port 249 and optical output port 251. In one embodiment, optical fibers or the like are optically coupled to optical input port 249 and optical output port 251.

In one embodiment, optical confinement regions 261 and 263 are disposed along the sides of optical path between optical input port 249 and optical output port 251. As shown in the embodiment depicted in FIG. 2, optical confinement regions 261 and 263 are disposed a distance D away from insulating regions 253, 254, 255 and 256. In one embodiment, D is a distance greater than or equal to zero. Accordingly, in another embodiment in which D is equal to zero, optical confinement regions 261 and 263 are adjacent to insulating regions 253, 254, 255 and 256. In one embodiment, the optical confinement regions 261 and 263 include insulative material such as for example oxide and semiconductor substrate layer 203 includes for example silicon. As a result, optical beam 211 and switched optical beam 227 are confined to remain within the semiconductor substrate layer 203 and well region 244 until exiting through optical output port 251. In one embodiment, optical confinement layers, similar to for example optical confinement layer 157 and optical confinement layer 105 of FIG. 1, are also disposed along the "top" and "bottom" of the optical path is disposed between optical input port 249 and optical output port 251. These optical confinement layers are not shown in FIG. 2 for clarity.

In the depicted embodiment, trench capacitors 235, 236, 237 and 238 are biased in response to signal voltages such that the concentration of free charge carriers in charged regions 239, 240, 241 and 242 of the stack of trench capacitors is modulated. In one embodiment in which D is greater than zero, an optical beam 211 is directed through semiconductor substrate layer 203 such that a portion of optical beam 211 is directed to pass through the modulated charge regions 239, 240, 241 and 242 and a portion of optical beam 211 is not directed to pass through the modulated charge regions 239, 240, 241 and 242. As a result of the modulated charge concentration in charged regions 239, 240, 241 and 242, optical beam 211 is switched resulting in switched optical beam 227 being directed from the stack of trench capacitors through semiconductor substrate layer 203.

In one embodiment, trench capacitors are operated in accumulation mode. Thus, if the polysilicon of trench capacitors 235, 236, 237 and 238 include P-type silicon and well region 244 includes n-type silicon and a positive charge is applied to trench capacitors 235, 236, 237 and 238, holes and electrons are clustered in charged regions 239, 240, 241 and 242 as shown in FIG. 2. Similarly, if the polysilicon of trench capacitors 235, 236, 237 and 238 include N-type silicon and well region 244 includes p-type silicon and a negative charge is applied to trench capacitors 235, 236, 237 and 238, electrons and holes are clustered in charged regions 239, 240, 241 and 242. In other embodiments, it is appreciated-that trench capacitors 235, 236, 237 and 238 may be operated in other modes such as for example depletion or inversion. It is appreciated that by operating in accumulation mode, higher switching speeds for trench capacitors 235, 236, 237 and 238 may be realized. In addition, by utilizing a higher doped well region 244 in accordance with the teachings of the present invention, more free charge carriers are available making even higher switching speeds possible for trench capacitors 235, 236, 237 and 238 compared to situation with fewer free charge carriers present.

In one embodiment, the free charge carriers attenuate optical beam 211 when passing through semiconductor substrate layer 203. In particular, the free charge carriers attenuate optical beam 211 by scattering optical beam 211 and consequently converting some of the energy of optical beam 211 into free charge carrier energy. In order to reduce attenuation of optical beam 211 as a result of the free charge carriers in semiconductors substrate layer 203, the doping concentration of semiconductors substrate layer 203 is lower than the doping concentration of well region 244.

In another embodiment, the phase of the portion of optical beam 211 that passes through the charged regions 239, 240, 241 and 242 is modulated in response to the signal. In one embodiment, the phase of optical beam 211 passing through free charge carriers in charged regions 239, 240, 241 and 242 is modulated due to the plasma optical effect. The plasma optical effect arises due to an interaction between the optical electric field vector and free charge carriers that may be present along the propagation path of the optical beam 211. The electric field of the optical beam 211 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda) \Delta n L \qquad \text{(Equation 2)}$$

with the optical wavelength λ and the interaction length L. In the case of the plasma optical effect in silicon, the refractive index change Δn due to the electron ($\Delta N_e$) and hole ($\Delta N_h$) concentration change is given by:

$$\Delta n = -\frac{e^2 \lambda^2}{8\pi^2 c^2 \varepsilon_0 n_0} \left( \frac{b_e (\Delta N_e)^{1.05}}{m_e^*} + \frac{b_h (\Delta N_h)^{0.8}}{m_h^*} \right) \qquad \text{(Equation 3)}$$

where no is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters.

In one embodiment, the amount of phase shift φ of some portions of optical beam 211 passing through the free charge carriers of charged regions 239, 240, 241 and 242 is approximately π/2. In one embodiment, the phase of a portion of optical beam 211 not passing though the free charge carriers of charged regions 239, 240, 241 and 242, i.e. passing through uncharged regions, is relatively unchanged. In one embodiment, a resulting interference occurs between the phase modulated portions and non-phase modulated portions of optical beam 211 passing through the stack of trench capacitors 235, 236, 237 and 238. In one embodiment in which D is equal to zero, there is no portion of optical beam 211 not passing though the free charge carriers of charged regions 239, 240, 241 and 242 as optical confinement regions 261 and 263 confine optical beam 211 to pass through charged regions 239, 240, 241 and 242.

It is noted that optical switch 201 has been illustrated in FIG. 2 with four trench capacitors 235, 236, 237 and 238. It is appreciated that in other embodiments, optical switch 201 may include a greater or fewer number of trench capacitors in accordance with the teachings of the present invention with the number of trench capacitors chosen to achieve the required phase shift. In particular, the interaction length L discussed in connection with Equation 2 above may be varied by increasing or decreasing the total number of trench capacitors 235, 236, 237 and 238 in optical switching device 234 of optical switch 201.

Figure 3:
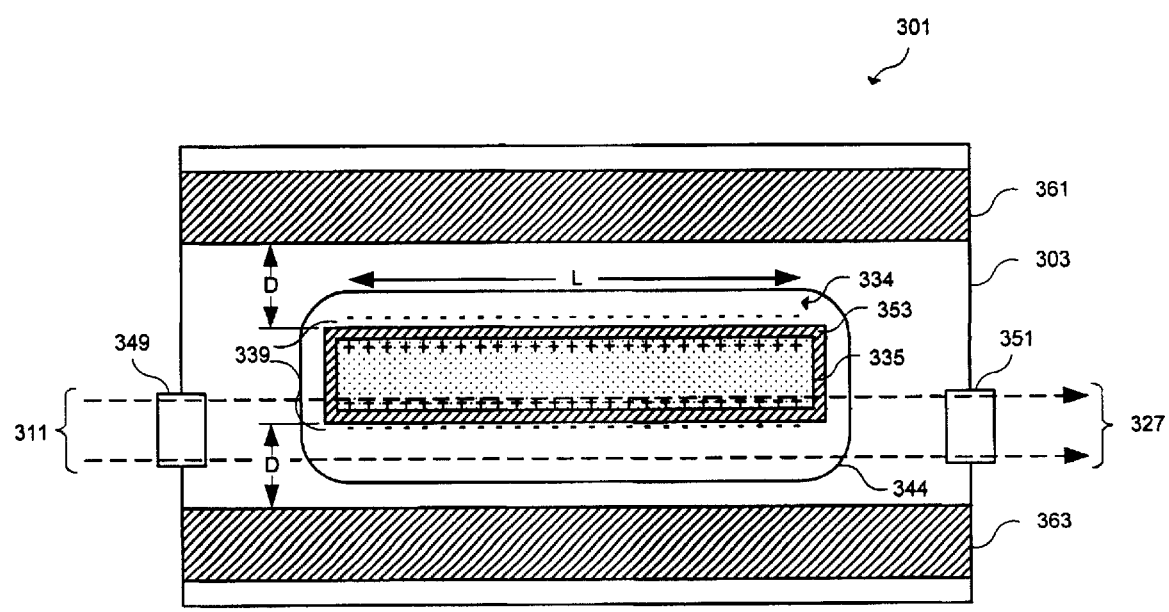
FIG. 3 is a top view illustration of another embodiment of an optical switch including an optical switching device disposed in a highly doped well region that is biased to modulate a phase of a portion of an optical beam in accordance with the teachings of the present invention.

FIG. 3 is a top view illustration of one embodiment of an optical switch 301 including a higher doped well region 344 in which an optical switching device 334 is disposed that is biased such that an optical beam 311 is switched in accordance with the teachings of the present invention. As illustrated, one embodiment of optical switch 301 includes an optical switching device 334 having a trench capacitor 335 disposed in a higher doped well region 344, which is disposed in lower doped semiconductor substrate layer 303. An insulating region 353 is disposed between the polysilicon of trench capacitor 335 and well region 344. In one embodiment, trench capacitor 335 is one of a plurality or stack of trench capacitors disposed in semiconductor substrate layer 303. An optical path is disposed between optical input port 349 and optical output port 351. In one embodiment, optical fibers or the like are optically coupled to optical input port 349 and optical output port 351.

In one embodiment, optical confinement regions 361 and 363 are disposed along the sides of optical path between optical input port 349 and optical output port 351. As shown in the embodiment depicted in FIG. 3, optical confinement regions 361 and 363 are disposed a distance D away from insulating region 353. In one embodiment, D is a distance greater than or equal to zero. In one embodiment, the optical confinement regions 361 and 363 include insulative material such as for example oxide and semiconductor substrate layer 303 includes for example silicon. As a result, optical beam 311 and switched optical beam 327 are confined to remain within the semiconductor substrate layer 303 and well region 344 until exiting through optical output port 351. In one embodiment, optical confinement layers, similar to for example optical confinement layer 157 and optical confinement layer 105 of FIG. 1, are also disposed along the "top" and "bottom" of the optical path is disposed between optical input port 349 and optical output port 351. These optical confinement layers are not shown in FIG. 3 for clarity.

In the depicted embodiment, trench capacitor 335 is biased in response to a signal such that the concentration of free charge carriers in charged regions 339 is modulated. In one embodiment, trench capacitor 335 is operated in accumulation mode. In other embodiments, trench capacitor 335 is operated in depletion or inversion mode. In an embodiment in which D is greater than zero, an optical beam 311 is directed through semiconductor substrate layer 303 into well region 344 such that a portion of optical beam 311 is directed to pass through the modulated charge region 339 and a portion of optical beam 311 is not directed to pass through the modulated charge region 339. As a result of the modulated charge concentration in charged region 339, optical beam 311 is switched resulting in switched optical beam 327 being directed from trench capacitor 335 through semiconductor substrate layer 303. In an embodiment in which D is equal to zero, there is no portion of optical beam 311 not passing through modulated charge region 339.

In one embodiment, the phase of the portion of optical beam 311 that passes through the charged regions 339 is modulated in response to the signal due to the plasma optical effect discussed above. As can be observed from Equation 2 above, one way to increase the phase shift φ in optical beam 311 is to increase the interaction length L of the charged region 339. In one embodiment, an increase interaction length L is provided by trench capacitor 335 by providing an increased dimension L, as illustrated in FIG. 3.

Figure 4:
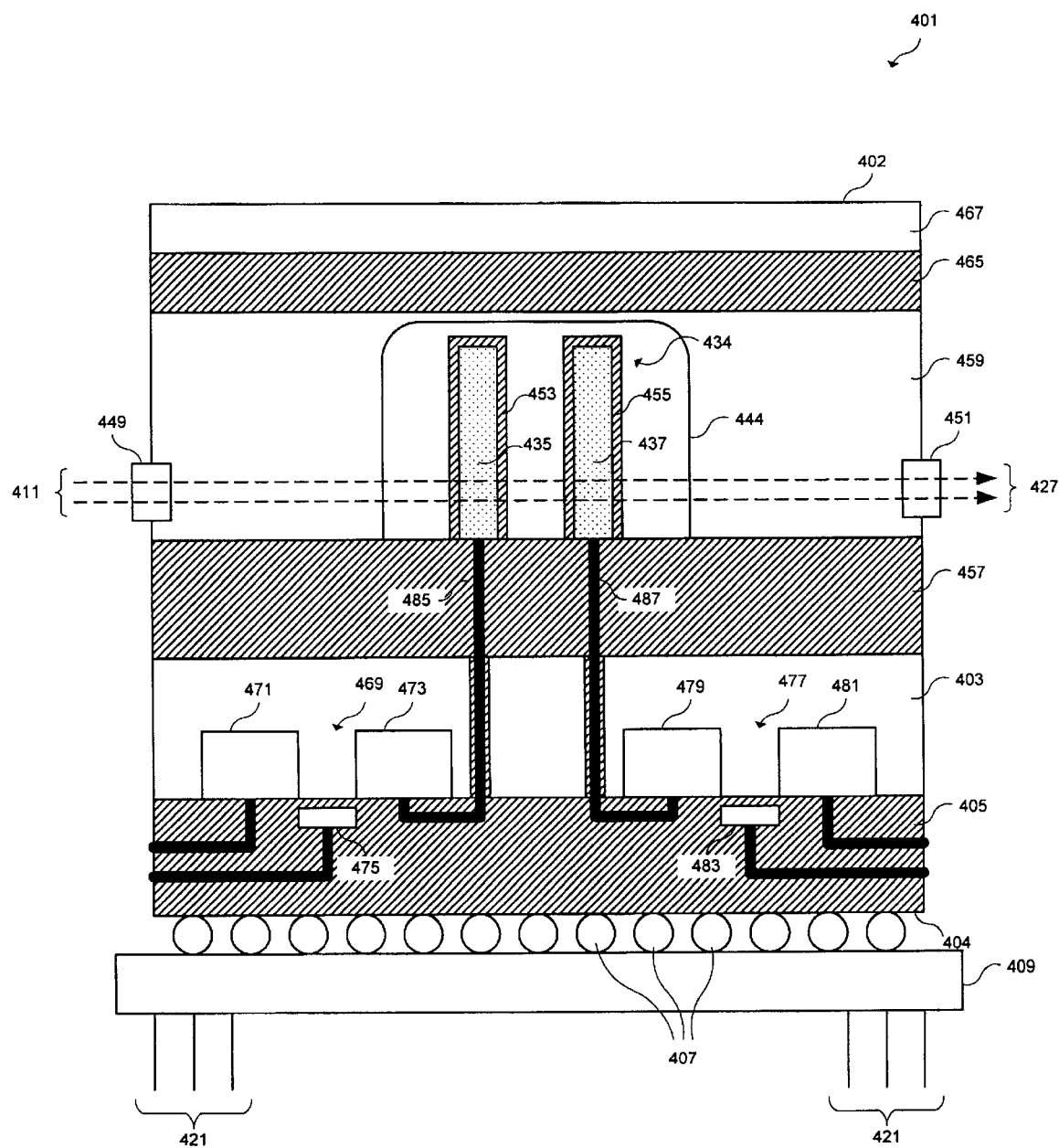
FIG. 4 is a side view illustration of another embodiment of an optical switch including an optical switching device disposed in a highly doped well region and modulation signal generation circuitry in accordance with the teachings of the present invention.

FIG. 4 is a side view illustration of another embodiment of an optical switch 401 including a higher doped well region 444 in which an optical switching device 434 is disposed. Optical switch 401 has some similarities to the optical switch 101 of FIG. 1 insofar as one embodiment of optical switch 401 includes an optical switching device 434 having a plurality of trench capacitors 435 and 437 disposed in a higher doped well region 444 disposed in a lower doped semiconductor substrate layer 459 between an optical input port 449 and an optical output port 451. In one embodiment, optical fibers or the like are optically coupled to optical input port 449 and optical output port 451.

In one embodiment, insulating regions 453 and 455 are disposed between well region 444 and the polysilicon of trench capacitors 435 and 437, respectively. In one embodiment, a signal is coupled to be received by trench capacitor 435 through conductor 485 and a signal' is coupled to be received by trench capacitor 437 through conductor 487. In one embodiment, conductors 485 and 487 are routed through an optical confinement layer 457 from integrated circuitry disposed in a semiconductor substrate layer 403. In one embodiment, semiconductor substrate layer 403 is disposed between optical confinement layer 405 and optical confinement layer 457. In one embodiment, optical switch 401 is packaged as a flip-chip packaged integrated circuit.

As illustrated in the embodiment depicted in FIG. 4, optical switch 401 includes a plurality of semiconductor substrate layers 403, 459 and 467 and optical confinement layers 405, 457 and 465. In one embodiment, semiconductor substrate layer 403 is disposed between optical confinement layers 405 and 457 and semiconductor substrate layer 459 is disposed between optical confinement layers 457 and 465. In one embodiment, optical switch 401 is fabricated from a multi-layered SOI wafer. In one embodiment, all optical confinement layers 465, 457 and 405 include insulating layers.

Optical input port 449 is optically coupled through semiconductor substrate layer 459 and well region 444 to optical switching device 434. Similarly, optical output port 451 is optically coupled through semiconductor substrate layer 459 and well region 444 to optical switching device 434. In one embodiment, optical beam 411 is directed from optical input port 449 and is directed through semiconductor substrate layer 403 into well region 444 to optical switching device 434. Switched optical beam 427 is then switched or modulated in response to the signals received by trench capacitors 435 and 437 and directed to optical output port 451. In one embodiment, the trench capacitors 435 and 437 of optical switching device 434 are operated in accumulation mode. In other embodiments, the trench capacitors 435 and 437 of optical switching device 434 are operated in depletion or inversion mode.

As shown in the embodiment depicted in FIG. 4, optical confinement layers 457 and 465 confine light from optical beam 411 to remain in semiconductor substrate layer 459 and well region 444 until exiting through optical output port 451. Therefore, loss of optical energy of optical beam 411 and switched optical beam 427 is reduced. It is noted that optical switch 401 is shown in FIG. 4 as having two semiconductor substrate layers 403 and 459 separated by optical confinement layer 457 for explanation purposes. In other embodiments, it is appreciated that additional semiconductor substrate layers may be included in optical switch 401, some or all of which including optical switching devices, that are optically confined with optical confinement layers in accordance with the teachings of the present invention.

In one embodiment, the integrated circuitry included in optical switch 401 is disposed in another semiconductor substrate layer. For instance, as illustrated in FIG. 4, transistors 469 and 477 of the integrated circuitry of optical switch 501 are disposed in semiconductor substrate layer 403. In one embodiment, semiconductor substrate layer 403 is disposed proximate to optical confinement layer 457 such that optical confinement layer 457 is disposed between semiconductor substrate layers 403 and 459. In one embodiment, transistor 469 includes doped regions 471 and 473 disposed in semiconductor substrate layer 403 and gate 475 disposed between doped regions 471 and 473 in optical confinement layer 405. Transistor 477 includes doped regions 479 and 481 disposed in semiconductor substrate layer 403 and gate 483 disposed between doped regions 479 and 481 in optical confinement layer 405.

In one embodiment, transistors 469 and 477 are included in driver circuitry used to drive trench capacitors 435 and 437. As shown in the embodiment of FIG. 4, doped region 473 is coupled to trench capacitor 435 through conductor 485 and doped region 479 is coupled to trench capacitor 437 through conductor 487. In one embodiment, the integrated circuitry disposed in semiconductor substrate layer 403 may include driver circuitry, controller circuitry, logic circuitry, alignment circuitry, coder/decoder (CODEC) circuitry, application specific integrated circuitry (ASIC), microprocessor circuitry, microprocessor circuitry, or the like.

Referring back to the embodiment illustrated in FIG. 4, switching device 401 has a layout such that the integrated circuitry driving the trench capacitors 435 and 437 of optical switching device 434 is disposed in the semiconductor substrate layer 403 opposite and/or across optical confinement layer 457. As a result, transistors 469 and 477 are relatively close in distance to optical switching device 434. Thus, conductors 485 and 487 are shorter in length than they would be if the integrated circuitry driving trench capacitors 435 and 437 were disposed further away in for example the same semiconductor substrate layer 459. Since shorter length conductors 485 and 487 are be employed in accordance with the teachings of the present invention, reduced loads and/or capacitances are associated with conductors 485 and 487. Therefore, higher switching speeds of trench capacitors 435 and 437 of optical switching device 434 through conductors 485 and 487 are attainable in accordance with the teachings of the present invention. For instance, in one embodiment, nanosecond switching speeds or faster are realized with optical switch 401.

In one embodiment, optical switch 401 is fabricated from a multi-layered SOI wafer including a semiconductor substrate layer 467, which is disposed proximate to an optical confinement layer 465, which is disposed proximate to semiconductor substrate layer 459, which is disposed proximate to optical confinement layer 457, which is disposed proximate to semiconductor substrate layer 403, which is disposed proximate to optical confinement layer 405. In one embodiment, all optical confinement layers 465, 457 and 405 include insulating layers. In one embodiment, optical confinement layers 465 and 457 confine optical beam 411 and switched optical beam 427 from exiting semiconductor substrate layer 459 until exiting through optical output port 451.

Throughout this specification, it is noted that the optical switching devices 134, 234, 334 and 434 of the optical switches of FIGS. 1–4 have been illustrated using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of optical switching devices may be employed in accordance with the teachings of the present invention. Other known types of optical switching devices that may be employed include for example thermal heaters, current injectors, P-N junctions, or the like.

As is known, thermal heating of the semiconductor substrate layer in the optical beam can be employed to change the index of refraction to phase shift an optical beam. In one embodiment of the present invention, known thermal heating is accomplished in an optical switching device by depositing thermal heaters on the surface of a semiconductor substrate layer in the form of polysilicon resistors or implanting diffusion based resistors and passing current through these resistors. In another embodiment, known current injectors are employed in an optical switching device for current injection to inject charge carriers into the phase shift region of in the semiconductor substrate layer. In yet another embodiment, current injection is accomplished by an optical switching device by using known forward biased diodes or P-N junctions disposed in the semiconductor substrate layer. In still another embodiment, known reverse biased P-N junctions are employed by an optical switching device, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a semiconductor substrate layer having a first doping concentration;
   a doped region disposed in the semiconductor substrate layer, the doped region having a second doping concentration, the second doping concentration greater than the first doping concentration;
   an optical switching device disposed in the doped region; and
   first and second optical ports disposed in the semiconductor substrate layer, the first and second optical ports optically coupled to the optical switching device.

2. The apparatus of claim 1 wherein the first and second optical ports are disposed in the semiconductor substrate layer outside of the doped region.

3. The apparatus of claim 1 wherein the first optical port is optically coupled to the optical switching device through the semiconductor substrate and through the doped region.

4. The apparatus of claim 1 further comprising a signal line coupled to the optical switching device, wherein an optical coupling between optical switching device and the second optical port is modulated in response to a signal coupled to be received by the optical switching device through the signal line.

5. The apparatus of claim 4 wherein the optical coupling between the optical switching device and the second optical port is through the semiconductor substrate and through the doped region.

6. The apparatus of claim 4 wherein the optical switching device comprises a charged region, the charged region modulated in response to the signal.

7. The apparatus of claim 6 wherein the charged region is modulated in accumulation mode.

8. The apparatus of claim 6 wherein the charged region is modulated in depletion mode.

9. The apparatus of claim 6 wherein the charged region is modulated in inversion mode.

10. The apparatus of claim 4 wherein a phase of the optical coupling between optical switching device and the second optical port is modulated in response to the signal coupled to be received by the optical switching device through the signal line.

11. The apparatus of claim 4 further comprising circuitry to generate the signal coupled to the signal line.

12. The apparatus of claim 1 wherein the semiconductor substrate layer comprises silicon.

13. A method, comprising:
    directing an optical beam from a first optical port disposed in a semiconductor substrate layer into a doped region disposed in the semiconductor substrate layer, the semiconductor substrate layer having a first doping concentration, the doped region having a second doping concentration greater than the first doping concentration;
    directing the optical beam through an optical switching device disposed in the doped region; and
    directing the optical beam from the doped region to a second optical port disposed in the semiconductor substrate layer, the second optical port disposed outside the doped region.

14. The method of claim 13 wherein the first optical port is disposed outside the doped region.

15. The method of claim 13 further comprising modulating an optical coupling between the optical switching device and the second optical port in response to a signal coupled to be received by the optical switching device.

16. The method of claim 15 further comprising modulating a charge region of the optical switching device in the doped region in response to the signal.

17. The method of claim 15 further comprising generating the signal with control circuitry.

18. The method of claim 13 further comprising operating the optical switching device in accumulation mode.

19. The method of claim 13 further comprising operating the optical switching device in depletion mode.

20. The method of claim 13 further comprising operating the optical switching device in inversion mode.

21. The method of claim 13 further comprising modulating a phase of an optical coupling between the optical switching device and the second optical port in response to a signal coupled to be received by the optical switching device.

22. An apparatus, comprising:
    means for receiving an optical beam in a semiconductor substrate layer having a first doping concentration;
    means for directing the optical beam through the semiconductor substrate layer into a doped region disposed in the semiconductor substrate layer, the doped region having a second doping concentration, the second doping concentration greater than the first doping concentration; and
    means for directing the optical beam from the doped region to a means for transmitting the optical beam from the semiconductor substrate layer in response to a signal.

23. The apparatus of claim 22 wherein the means for directing the optical beam from the doped region to the means for transmitting the optical beam comprises means for modulating a charge region of the means for directing the optical beam in response to a signal.

24. The apparatus of claim 22 wherein the means for modulating the charge region is coupled to be operated in accumulation mode.

25. The apparatus of claim 22 wherein the means for modulating the charge region is coupled to be operated in depletion mode.

26. The apparatus of claim 22 wherein the means for modulating the charge region is coupled to be operated in inversion mode.

27. The apparatus of claim 22 further comprising means for generating the signal coupled to the means for directing the optical beam from the doped region.

* * * * *